Nov. 27, 1962 R. E. JACKSON 3,065,934
HELICOPTER AIRCRAFT
Filed Oct. 15, 1957 4 Sheets-Sheet 1

Ronald E. Jackson
INVENTOR.

BY *Clarence A. O'Brien*
*and Harvey B. Jackson*
Attorneys

Ronald E. Jackson
INVENTOR.

Nov. 27, 1962  R. E. JACKSON  3,065,934
HELICOPTER AIRCRAFT
Filed Oct. 15, 1957  4 Sheets-Sheet 3
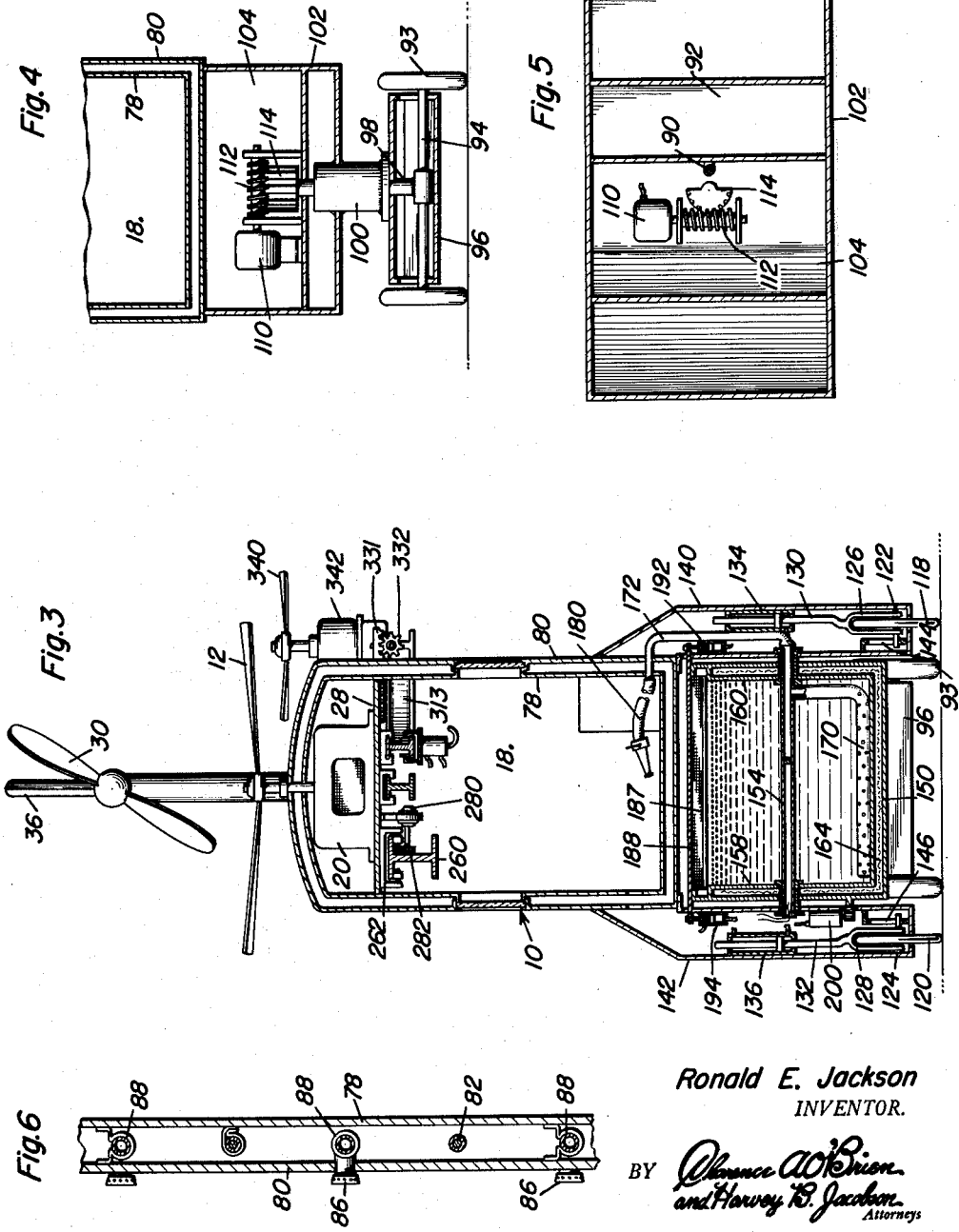
Ronald E. Jackson
INVENTOR.

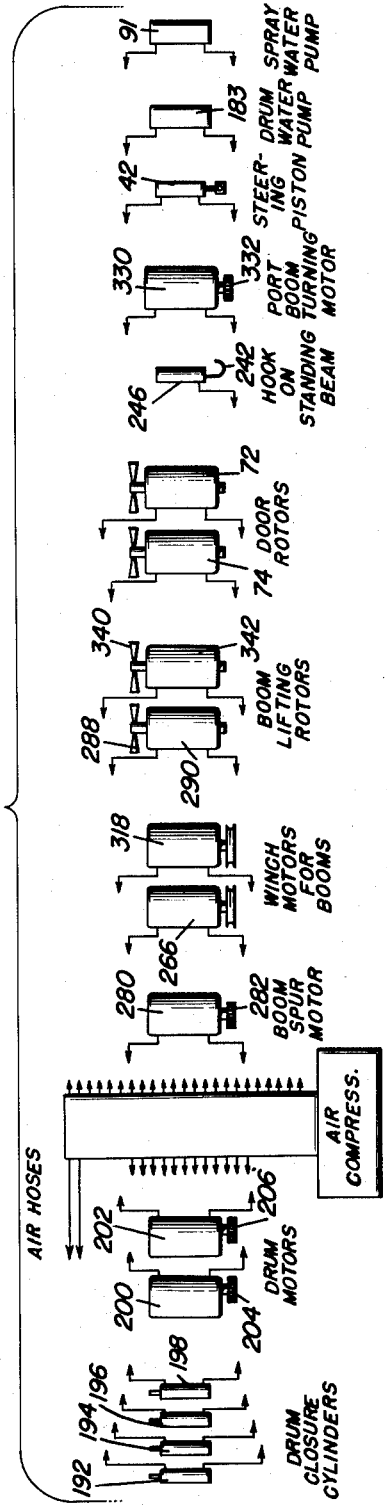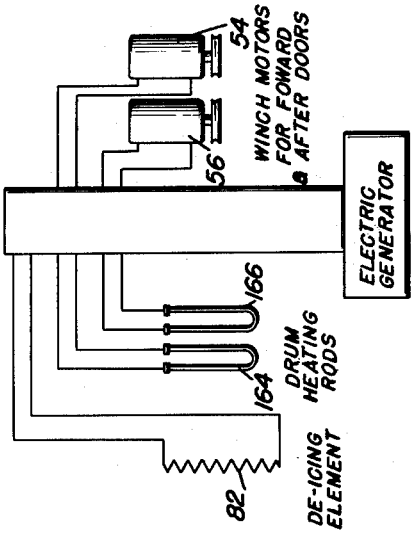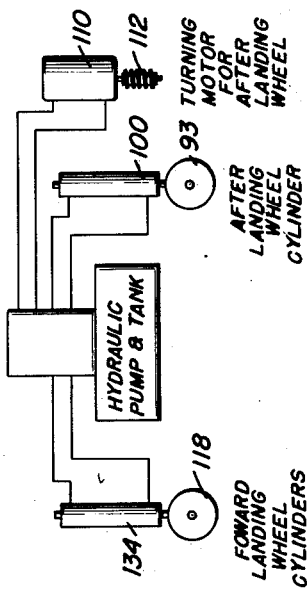
Ronald E. Jackson
INVENTOR.

United States Patent Office 3,065,934
Patented Nov. 27, 1962

3,065,934
HELICOPTER AIRCRAFT
Ronald E. Jackson, Corpus Christi, Tex.
(R.F.D. 1, Box 22A, Ingleside, Tex.)
Filed Oct. 15, 1957, Ser. No. 690,314
7 Claims. (Cl. 244—17.21)

This invention relates to an aircraft of the type which has sustaining rotors and more particularly to an aircraft of that type which is designed and equipped to serve as a hospital ship, fire fighting machine or otherwise as an instrumentality for aiding in the saving of lives during disaster.

The object of the invention is to provide an aircraft of the type which has one or more sustaining rotors, the aircraft having what I consider to be a novel and unique arrangement of structure designed for the purpose of facilitating the saving of lives during fires especially but capable of being used for sea rescue work or other work in the saving of lives during periods of disaster.

A more particular object of the invention is to provide a rescue aircraft capable of fire fighting and capable of preventing fire or at least retarding fire from attacking the aircraft during rescue work, the aircraft having a novel cabin organization, system of rotors and booms as well as doors, together with water or other fire fighting liquid storage facilities.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a transverse sectional view taken on the line 3—3 of FIGURE 2;

FIGURE 4 is a sectional view taken on the line 4—4 of FIGURE 2 and showing the after wheel with its means of support and control;

FIGURE 5 is a sectional view of the after wheel assembly and taken on the line 5—5 of FIGURE 2;

FIGURE 6 is a fragmentary enlarged sectional view showing the multi-skin construction of the aircraft cabin in addition to the de-icing heaters in the space between the two layers and spray system for the exterior of the cabin;

FIGURE 7 is a schematic view of the pneumatic system in the aircraft, the various hose connections and valves being omitted for the sake of clarity;

FIGURE 8 is a schematic view of the hydraulic system of the aircraft; and

FIGURE 9 is a schematic view of the electrical system in the aircraft, omitting the lights, engine ignition requirements and other electrical equipment which will be necessary but conventional.

Figure 1:
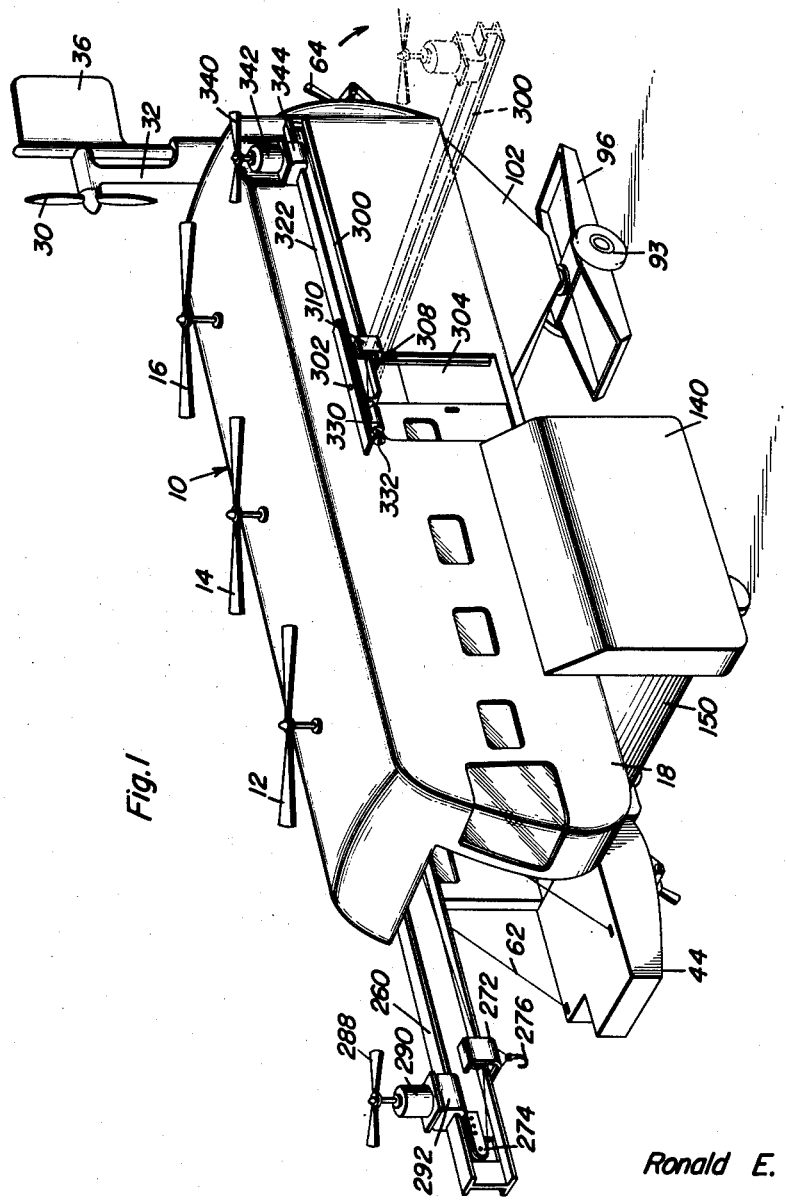
FIGURE 1 is a perspective view of a typical aircraft which exemplies the principles of the invention.

In the accompanying drawings there is an aircraft 10 which is constructed in accordance with the principles of the invention. The aircraft is of the type which has a plurality of sustaining rotors 12, 14 and 16 located above the cabin 18. Rotors 12, 14 and 16 have conventional controls and engines 20, 22 and 24 disposed in engine compartment 26 at the top part of the cabin 18 and above the ceiling 28 thereof. Fuel tanks are located in this compartment as is other equipment necessary to the functioning of the engines and the control of the sustaining rotors.

Propeller 30 is mounted on a standard 32 at the aft of cabin 18 and is actuated by engine 34 in compartment 26, through a gear train and shafts housed in the standard 32. Propeller 30 is used to provide horizontal thrust for the aircraft, and there is a directional control rudder 36 located downstream of the propeller 30. An arm 38 is fixed to the end of rudder shaft 40 and is operated by cylinder 42 that constitutes a part of the pneumatic system (FIG. 7).

Fore and aft doors 44 and 46, respectively, are mounted on hinges 48 and 50 that are connected to cabin 18 about eight inches above the floor level 52 thereof. Motors 54 and 56 (FIG. 9) are mounted in the cabin 18 and constitute a part of the electrical system. Each motor is drivingly connected to its winch, for example winch 58 for motor 54, and there are lifting cables 60 and 62 which form parts of the winches. These cables are attached to the doors 44 and 46 near their upper ends so that they may be operated to lift and lower the doors about their hinge pins to the closed and open positions. Propellers or rotors 64 and 66 are mounted on stands 68 and 70 that are attached to the doors 46 and 44. Pneumatic motors 72 and 74 are also carried by the stands 68 and 70 and they directly drive the rotors 64 and 66. The function of these rotors 64 and 66 is to obtain fine lateral maneuverability. For example when attempting a rescue from a high building, it may well be necessary to shift the open door 46 and/or 44 to a position of alignment with the window in the building, and this can be achieved easily by using the rotors 64 and/or 66. They are arranged so that the direction of thrust produced is perpendicular to the thrust produced by the lifting rotors 12, 14 and 16 and also perpendicular to the thrust produced by rotor 30.

Cabin 18 is constructed with spaced inner and outer walls 78 and 80. This is for insulation purposes and also so that the walls may contain a de-icer heater 82 (FIG. 9 and FIG. 6) placed where necessary throughout the cabin structure. As a precaution against excessive heat or possible fire, a sprinkler system including a plurality of sprinkler heads 86, is installed in the aircraft. The feeder pipes 88 for the spring heads 86 are carried between the double walls 78 and 80. The sprinkler system draws water through pipe 90 whose lower end is in communication with the bottom of tank 92 at the aft end of the cabin. A pump 91 is operatively connected in the system to draw the water from tank 92.

Aft wheel assembly 93 of the aircraft has an axle 94 with a pair of wheels at its ends. The axle is in a pontoon 96 that is supported by piston 98, the latter located in cylinder 100 and connected to axle 94 between its ends.

Cylinder 100 is rigidly attached to housing 102 that depends from the outer wall of cabin 18. Tank 92 is located in housing 102 and isolated from compartment 104 within which the after wheel assembly turning motor 110 is located. Motor 110 is hydraulically operated (FIG. 8) and has a worm gear 112 on its shaft and enmeshed with an elongate sector 114. This sector is fixed to piston rod 98 for oscillating the piston rod 98 and thereby steering the wheels of wheel assembly 93 together with pontoon 96. Cylinder 100 raises and lowers the wheel assembly and pontoon without regard for the steered position of the wheel assembly and pontoon.

Forward landing wheels 118 and 120 are mounted for rotation on axles 122 and 124 that are carried by forks 126 and 128 at the lower ends of piston rods 130 and 132. The piston rods constitute parts of cylinders 134 and 136 that are located in the housings 140 and 142. These housings are attached to the cabin 18 and depend from the forward part thereof. The inner extremities of the axles 122 and 124 are located in vertical guides 144 and 146 in the housings 140 and 142, these guides permitting the piston rods 130 and 132 to be raised and lowered but preventing them from rotating. Cylinders 134 and 136 constitute a part of the hydraulic system in the aircraft.

A pair of liquid holding double walled drums 150 and 152 are mounted for rotation between the housings 140 and 142. Axles 154 and 156 extend through the drums and establish axes of rotation for the two drums. They have their ends mounted in liquid seal bearings 158 and 160 in the end walls of the drums and in the inner walls of the two housings 140 and 142. The axles are hollow and each has a plug at one end through which wires pass to energize heating elements 164 in the space between the drum walls to heat the drums to prevent freezing.

A perforated tube 170 protrudes from the axles 154 and 156, there being one near the bottom of each tank 150 and 152 through which to draw liquid from the tank. Hoses 172 are connected by slip couplings to the ends of the axles 154 and 156 and they pass through housing 140 and terminate in a mixer within cabin 18 and from the valve of which fire fighting hose 180 extends.

The two drums 150 and 152 are mounted for rotation so that they may be turned to locate their water entrances 182 and 184 in registry with the sides or bottom of the aircraft. After the tanks are depleted of their supply of fire extinguishing liquid, they may be refilled through holes 185 in closures 188 and 190 by using drum water pump 183. Or they can be filled with sea water if any is available by having the tanks rotated until the entrances 182 and 184 face sideways at which position the aircraft is lowered into the water enabling it to run into the tanks or drums 150 and 152. Screens 187 are over the entrances, and screens will be used for all other openings where found necessary or desirable. After filling, the drums can be rotated so that the water entrances are up (FIG. 2.)

Figure 2:
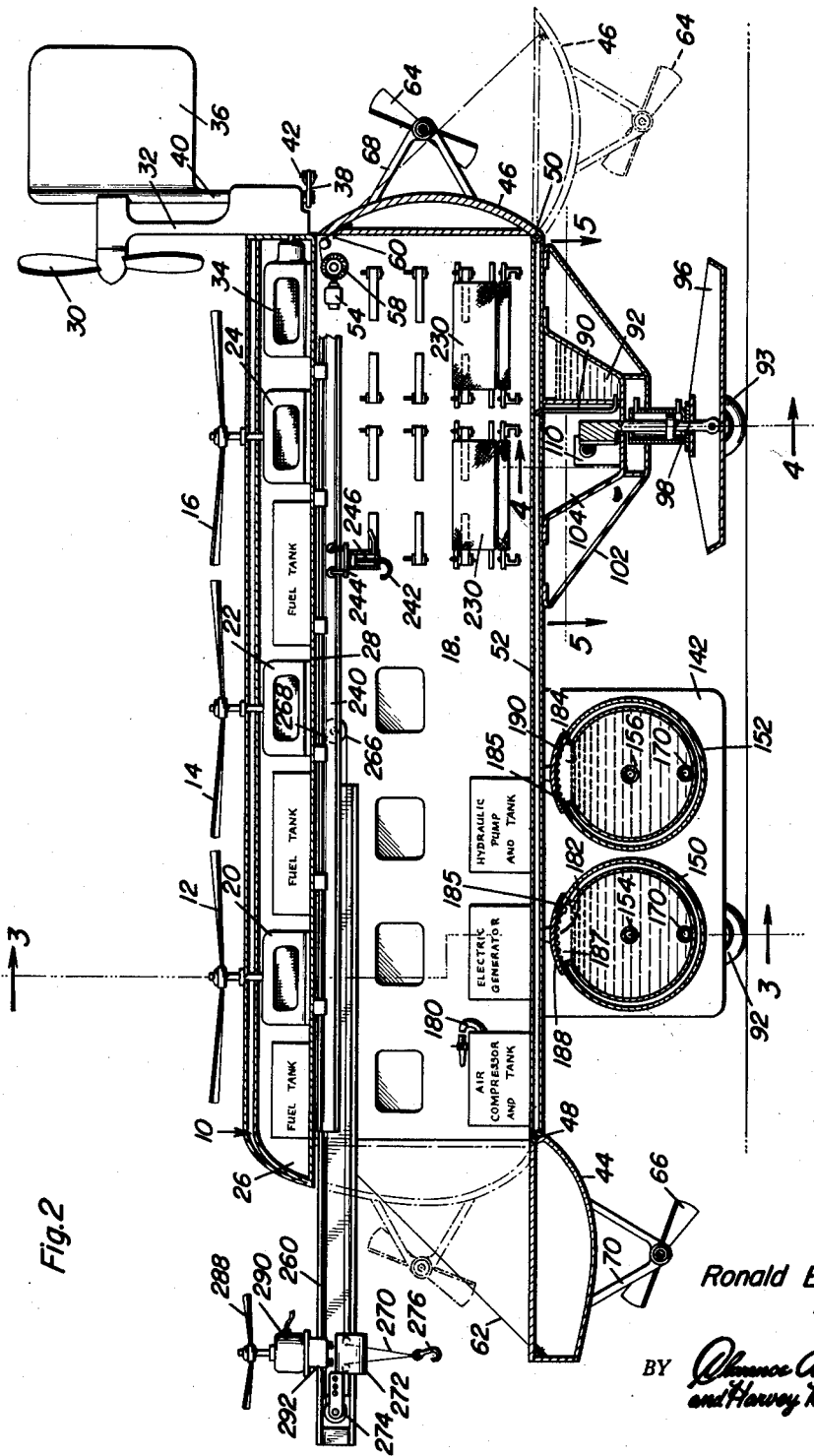
FIGURE 2 is a longitudinal sectional view of the aircraft in FIGURE 1.

Drum closures 188 and 190 are mounted in such a manner that they are capable of being opened and closed to prevent the water from splashing or otherwise escaping from the tops of the drums (FIG. 2). The closures have arms projecting from their ends, and there are pairs of cylinders 192, 194 and 196, 198 attached to the housings 140, 142 and the arms that protrude laterally from the drum closures 188 and 190. Motors 200 and 202, respectively, are located in the housings 142 and 140 and they have pinions on their shafts. The motors 200 and 202 are pneumatically operated and the pinions are enmeshed with segment gears formed on the ends of the drums. These motors together with the pinions and segment gears constitute means by which to rotate the drums to the loading positions. Motors 200 and 202 together with the gears that they drive could be replaced by direct acting pneumatic or hydraulic cylinders.

Cabin 18 is fitted with various first aid, medicinal, surgical and medical appliances. These are unshown, however, I have illustrated stretchers 230 which are operatively connected with the side walls of cabin 18 in such a manner that they are foldable to form seats and are removable to be used as a stretcher when needed.

A longitudinal beam 240 is attached to the ceiling 28 of cabin 18 and has a traveling hook 242 on carriage 244, that is movable thereon. The hook is at the end of the piston rod of cylinder 246 and schematically represents various types of grapples that may be used. Cylinder 246 is part of the pneumatic system of the aircraft (FIG. 7). The carriage 244 may be manually moved from one end of beam 240 to its opposite end.

Boom 260 is mounted parallel to beam 240 and is slidably mounted in an overhead rail 262 which is U-shaped in cross-section (FIG. 3) that has rollers supported on horizontal pins fixed to the legs on side flanges of rail 262 on which the upper flange of boom 260 is disposed. Winch motor 266 is attached to the upper part of cabin 18 and has a winch 268 driven by it. Cable 270 constitutes a part of the winch and extends over pulleys in carriage 272 and around idler 274 that is carried near the outer end of boom 260. The cable then returns to the winch drum. Grapple or coupling 276 is on a loop in the cable 270 and is used in the customary manner. The carriage, winch and cable comprise power operated means for moving the coupling 276. The winch is arranged so that it may propel and return the carriage 272 and it also pays out and winds cable 270 for the purpose of lifting the load with its coupling 276. The means for extending and retracting boom 260 consists of pneumatic motor 280 which is carried by the ceiling structure of cabin 18 and which operates a pinion 282 that is enmeshed with a rack gear on boom 260. By manipulation of valve controls the boom is extended or retracted when the motor 280 is energized by pressure from the valve, it rotates the pinion 282 which in turn reciprocates the rack and boom 260 to which it is secured. When extended, its load is supported by rotor 288 whose line of thrust is delivered in a vertical upward direction. The rotor 288 is operated by pneumatic motor 290 that is attached to boom 260 by motor mount 292. With the arrangement of parallel beam 240 and boom 260, grapple 242 may be used to transfer the load from grapple 276 while the aircraft is hovering or in flight.

Lateral boom 300 is mounted for pivotal movement on pivot 302 carried by a part of the cabin structure. It is located above doors 304 for ready access to the load carried by grapple 308 on carriage 310 that is mounted for movement on lateral boom 300. The carriage 310 is operated by a cable which constitutes part of a winch. Pneumatic motor 318 is drivingly connected to this winch and is arranged in a manner similar to the arrangement of the winch 268 and its motor 266. An interchange track 313 with a motor operated grapple is located between the booms and further facilitates loading from one boom to another or from the booms to the cabin.

The means for swinging the boom from the position nested within well 322 (FIG. 1) longitudinally in a side of the cabin, to the dotted line position which is the lateral, operative position, are a port boom turning motor 330 and pinion 332 fixed to the cabin structure and which is engaged with an arcuate gear sector 331 fixed on the inner end of boom 300. The sector is concentric with its pivot point 302 and has teeth engageable with the gear pinion 332.

Load supporting rotor 340 is attached to the shaft of the boom lifting rotor motor 342 carried by motor mount 344 near the end of boom 300. Rotor 320 is used for lifting in such manner to at least in part support the weight of the boom 300, this being the same function of rotor 288 with respect to its boom 260.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as clamied.

What is claimed as new is as follows:

1. In an aircraft which has sustaining rotors and a cabin, a boom, means including a motor for extending and retracting said boom, a lifting rotor connected to a power source, said rotor carried by said boom for providing a supporting effect on the boom when in the extended position, and means on the boom for lifting a load including a coupling movably supported on the boom adapted to suspend the load from the boom and power operated means connected to the coupling for moving it and the load relative to said boom.

2. In an aircraft of the type which has sustaining rotors, the combination comprising a cabin structure that has a door, at least one boom movably carried by the cabin structure, an aerodynamic sustaining rotor on said boom, a grapple carried by said boom, a beam in said cabin, a carriage on said beam, a grapple hook on said carriage, and means for raising and lowering said grapple hook to handle loads that are received by said grapple after lifting the loads.

3. In an aircraft which has a sustaining rotor means, a cabin structure, and a cargo supporting and conveying device carried by the structure, said cargo supporting and conveyong device comprising a boom, means movably mounting the boom on a part of the cabin structure, a motor operatively connected with the boom to move the boom to the cargo loading and unloading position and to return the boom, a lifting rotor carried by said boom for providing a supporting effect on the boom when the boom is moved to the loading and unloading position, and a carriage on said boom and movable lengthwise of the boom to facilitate loading the cargo and unloading the cargo from the cabin structure.

4. In an aircraft which has a sustaining rotor means, a cabin structure, and a cargo supporting and conveying device carried by the structure, said cargo supporting and conveying device comprising a boom, means movably mounting the boom on a part of the cabin structure, a motor operatively connected with the boom to move the boom to the cargo loading and unloading position and to return the boom, a lifting rotor carried by said boom for providing a supporting effect on the boom when the boom is moved to the loading and unloading position, a carriage on said boom and movable lengthwise of the boom to facilitate loading the cargo and unloading the cargo from the cabin structure, a track in said cabin structure and in registry with the boom, and said carriage movable from said boom to said track so that said carriage may traverse the track in the cabin structure in order to unload and load cargo in the cabin structure.

5. In an aircraft which has a sustaining rotor means, a cabin structure, and a cargo supporting and conveying device carried by the structure, said cargo supporting and conveying device comprising a boom, means composed of a track attached to said structure for movably mounting the boom on a part of the cabin structure, a motor operatively connected with the boom to move the boom to the cargo loading and unloading position and to return the boom, a lifting rotor carried by said boom for providing a lifting effect on the boom when the boom is moved to the loading and unloading position, a carriage on said boom and movable lengthwise of the boom to facilitate loading the cargo into and unloading the cargo from the cabin structure, a beam in said cabin structure alongside of the boom, a grapple movably mounted on said beam, said carriage movable on said boom to positions alongside of said track so that said carriage may traverse the boom near the beam in the cabin structure to facilitate transfer of the cargo from the carriage to said grapple.

6. The combination of claim 4 wherein there is a beam carried by said cabin structure at the top portion thereof to further facilitate loading and unloading of the cargo into and from the cabin structure, said beam having a grapple thereon, and the cabin structure having an opening with which said boom is registerable.

7. A hovering type aircraft comprising a cabin, primary lifting means connected to a power source and attached to the cabin for producing a vertical thrust and normally supporting the aircraft, a boom movably attached to the cabin, means including a motor connected to the boom and cabin for extending and retracting the boom into and out of the cabin, a secondary lifting means also connected to a power source and carried by said boom for providing a lift directly to said boom when extended which is separate from the lift produced by the primary lifting means, and hoisting means separate from the boom and mounted thereon for lifting a load, said hoisting means including a coupling means below the boom movable towards and away from the boom, said coupling adapted to couple a cargo load to the hoisting means for moving the load up and down below the aircraft.

References Cited in the file of this patent
UNITED STATES PATENTS

| | | |
|---|---|---|
| 1,277,206 | Fedchenko | Aug. 27, 1918 |
| 1,419,311 | Sankey | June 13, 1922 |
| 1,514,428 | Burke | Nov. 4, 1924 |
| 2,130,918 | De Stefano | Sept. 20, 1938 |
| 2,268,009 | Babb | Dec. 30, 1941 |
| 2,425,499 | Watter | Aug. 12, 1947 |
| 2,623,711 | Pullin et al. | Dec. 30, 1952 |
| 2,738,146 | Medvedeff | Mar. 13, 1956 |
| 2,862,680 | Berger | Dec. 2, 1958 |